(12) United States Patent
Song et al.

(10) Patent No.: US 6,350,240 B1
(45) Date of Patent: Feb. 26, 2002

(54) ULTRASOUND IMAGING METHOD AND APPARATUS BASED ON PULSE COMPRESSION TECHNIQUE USING MODIFIED GOLAY CODES

(75) Inventors: Tai Kyong Song; Yang Mo Yoo, both of Seoul (KR)

(73) Assignee: Medison Co., LTD, Kangwon-Do (KR)

( * ) Notice: Subject to any disclaimer, the term of this patent is extended or adjusted under 35 U.S.C. 154(b) by 0 days.

(21) Appl. No.: 09/633,308

(22) Filed: Aug. 7, 2000

(30) Foreign Application Priority Data

Feb. 1, 2000 (KR) .......................................... 2000-4830

(51) Int. Cl.[7] ................................................ A61B 8/00
(52) U.S. Cl. ...................................... 600/443; 600/447
(58) Field of Search ................................ 600/447, 443, 600/444, 445, 448, 449; 128/916

(56) References Cited

U.S. PATENT DOCUMENTS 6,155,980 A * 12/2000 Chiao et al. ................. 600/447
6,210,332 B1 * 4/2001 Chiao et al. ................. 600/443
6,241,674 B1 * 6/2001 Phillips et al. ............... 600/443

* cited by examiner

Primary Examiner—Marvin M. Lateef
Assistant Examiner—Maulin Patel
(74) Attorney, Agent, or Firm—Thelen Reid & Priest LLP; David B. Ritchie

(57) ABSTRACT

An ultrasound imaging method for forming an image of an object using received signals reflected from the object, received after transmitting an ultrasound pulse to the object. The inventive method comprises the steps of (a) transmitting a first set of the ultrasound pulses to the object by applying voltages according to a first code of a pair of modified Golay codes to one or more transducers; (b) performing pulse compression on a first set of reflected signals of the first set of the ultrasound pulses reflected from the object; (c) transmitting a second set of the ultrasound pulses to the object by applying the voltages according to a second code of the pair of the modified Golay codes to said one or more transducers; (d) performing pulse compression on a second set of reflected signals of the second set of the ultrasound pulses reflected from the object; (e) adding the pulse compressed signals of the first and the second sets of the reflected signals; (f) producing a receive-focused signal by using the added signal; and (g) displaying the image according to the receive-focused signal after signal processing.

12 Claims, 5 Drawing Sheets

Golay code
(a-type)

Fig. 2B $b_i$

Golay code
(b-type)

Fig. 2C

$c_j = \sum_{i=1}^{n-j} a_i a_{i+j}$

Autocorrelation
characteristic
(a-type)

Fig. 2D $d_j = \sum_{i=1}^{n-j} b_i b_{i+j}$

Autocorrelation
characteristic
(b-type)

Fig. 2E $c_j + d_j = \begin{cases} 0 & j \neq 0 \\ 2n & j = 0 \end{cases}$

ULTRASOUND IMAGING METHOD AND APPARATUS BASED ON PULSE COMPRESSION TECHNIQUE USING MODIFIED GOLAY CODES

BACKGROUND OF THE INVENTION

1. Field of the Invention

The present invention relates to an ultrasound imaging system. In particular, the invention relates to an ultrasound imaging system based on a pulse compression technique using modified Golay codes.

2. Description of the Related Art

Figure 1:
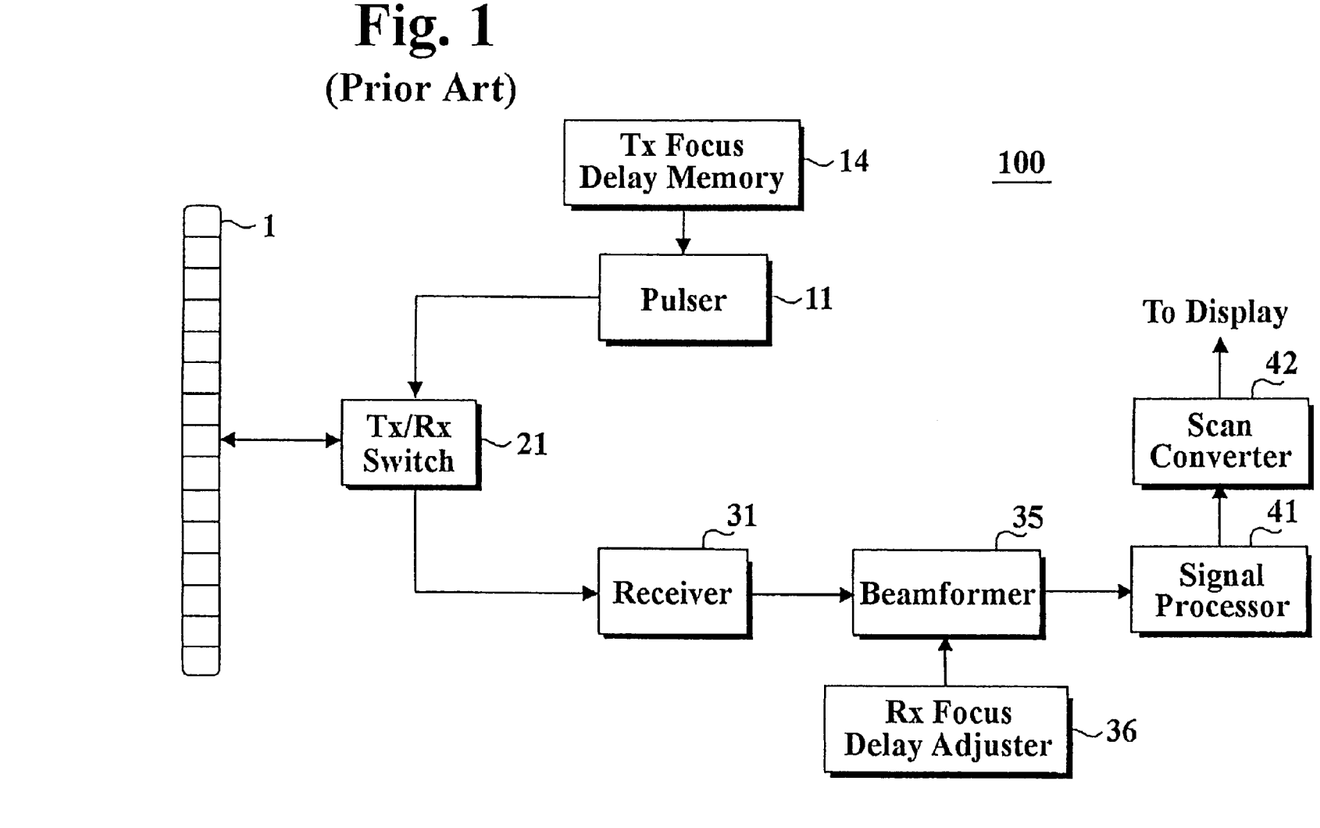
FIG. 1 is a block diagram of an ultrasound imaging system using a conventional short pulse technique.

Conventionally, a medical ultrasound imaging system obtains information about a human body by transmitting short ultrasound pulses. FIG. 1 shows a block diagram of a conventional short-pulse ultrasound imaging system 100, which comprises a transducer array 1, a pulser 11, a TX(transmission) focus delay memory 14, a TX/RX (receiving) switch 21, a receiver 31, a beamformer 35, an RX focus delay adjuster 36, a signal processor 41 and a scan converter 42.

The TX focus delay memory 14 stores a delay pattern of ultrasound pulses to be transmitted into a human body from the transducer array 1. The TX focus delay memory 14 provides a binary sequence corresponding to the delay pattern to the pulser 11.

As a method of determining the TX focus delay for each transducer, a fixed-focusing technique is commonly used, which focuses the energies of the ultrasound pulses on a predetermined point inside the body. Recently, as one of efforts to resolve the problem of limited resolution due to transmitting with the fixed-focusing while receiving with the dynamic focusing, a synthetic aperture technique has been studied. With the synthetic aperture technique, one or more transducers can be used for transmitting ultrasound and bi-directional dynamic focusing for transmitting and receiving is possible. By using the synthetic aperture technique, the resolution can be improved while SNR(signal-to-noise ratio) is decreased.

The pulser 11 is a bipolar pulser which supplies an amplified signal (e.g., +80 or −80 volt) to the transducer array 1 in response to the binary sequence input corresponding to the delay pattern. The voltage output of the pulser 11 having predetermined amplitude is applied to each transducer of the transducer array 1 at a time determined by the delay pattern.

The transducer array 1 includes a number of transducer elements and transmits the ultrasound pulses, in response to the output voltage of the pulser 11, into an object such as a human body. A portion of the transducer array 1 is used for transmission at a time. For example, even if the transducer array 1 includes 128 transducers, only 64 transducers within an aperture transmit the ultrasound at one time.

The transducer array 1 also receives a signal including reflected pulses of the transmitted ultrasound pulse, which is reflected from inside the body.

The TX/RX switch 21 acts as a duplexer for isolating the receiver 31 from the effect of the high voltage output from the pulser 11. The switch 21 connects the transducer array 1 to the pulser 11 during transmission mode and to the receiver 31 during reception mode.

The receiver 31 includes a pre-amplifier for amplifying the received signal, a TGC (time gain compensation) for compensating the attenuation during propagation of the ultrasound and an analog-to-digital converter for converting the amplified received signal to a digital signal.

The beamformer 35 performs the receiving focusing in accordance with the delay pattern from the RX focus delay adjuster 36.

The signal processor 41 performs signal processing such as envelope detection, log compensation to produce a B-mode image signal.

The scan converter 42 converts the B-mode image signal to a signal which may be visualized on a display device (not shown).

Due to the decrease in power of the ultrasound during propagation into highly attenuating medium such as rubber, soft tissue and the like, the short-pulse imaging system may not obtain information for a target object inside the body from which the short pulses are reflected.

Since the medical ultrasound imaging system 100 may cause damage to the body when it increases the peak voltage of the transmitted short pulses, the power of the received signal can not be increased in this way.

On the other hand, a pulse compression technique used in a radar apparatus is capable of improving the SNR of the ultrasound imaging system by increasing the average power instead of by increasing the peak voltage of the transmitted pulse. In the imaging system using the pulse compression technique, a coded long pulse is transmitted to the body instead of the short pulse.

In the medical imaging system 100 using the conventional short pulse, the image resolution in the ultrasound propagation direction depends on the impulse response of the ultrasound transducer used because the short pulse of a high voltage is used. However, in the imaging system using the pulse compression technique, the image resolution is determined by the convolution of the ultrasound transducer and the pulse, because the coded long pulse is used. In the pulse compression technique imaging system, a pulse compressor having a correlator at the ultrasound receiver achieves the effects of the short pulse transmission technique. Accordingly, it is capable of effectively increasing the SNR by transmitting the coded long pulse having a lower voltage than the peak voltage in the short pulse technique.

In the ultrasound imaging system using the coded long pulse, the system performance depends on the code characteristics. In particular, the resultant image quality depends on the relation of the frequency characteristics of a used code and the ultrasound transducer. And the system performance also depends on the pulse compressor implementation or the correlator implementation.

There has been some efforts to apply Golay codes to the long-pulse ultrasound imaging system because the Golay codes haves a characteristic of eliminating side-lobes. However, one of undesirable frequency characteristics of the Golay codes is a wider frequency spectrum than that of the conventional ultrasound transducer. That is, there is some loss in the power of a Golay code at the ultrasound transducer such that the SNR of the system can not reach a desired level.

SUMMARY OF THE INVENTION

An objective of the present invention is to provide codes of which frequency characteristics match with the frequency characteristic of the ultrasound transducer and an ultrasound imaging method based on a pulse compression technique using the codes.

Another objective of the present invention is to provide an imaging apparatus for effectively implementing the ultrasound imaging method using the codes.

In accordance with one aspect of the present invention, there is provided an ultrasound imaging method based on the pulse compression technique using Golay codes modified by using a predetermined window function.

In accordance with another aspect of the present invention, there is provided a method and apparatus for transmitting ultrasound pulses of the modified Golay codes, pulse-compressing the reflected signals corresponding the transmitted pulses and performing RX-focusing on the pulse-compressed signals.

The present invention provides an ultrasound imaging method for forming an image of an object using signals reflected from the object after transmitting an ultrasound pulse to the object, comprising the steps of;

(a) transmitting a first set of the ultrasound pulses to the object by applying voltages according to a first code of a pair of modified Golay codes to one or more transducers;

(b) performing pulse compression on a first set of reflected signals of the first set of the ultrasound pulses reflected from the object;

(c) transmitting a second set of the ultrasound pulses to the object by applying the voltages according to a second code of the pair of the modified Golay codes to said one or more transducers;

(d) performing pulse compression on a second set of reflected signals of the second set of the ultrasound pulses reflected from the object;

(e) adding the pulse compressed signals of the first and the second sets of the reflected signals;

(f) producing a receive-focused signal by using the added signal; and (g) displaying the image according to the receive-focused signal after signal processing.

And the present invention provides an ultrasound imaging apparatus for forming an image of an object using received signals reflected from the object after transmitting an ultrasound pulse to the object, comprising:

means for applying voltages according to a first code of a pair of modified Golay codes to one or more transducers at a first time period and for applying the voltages according to a second code of the pair of the modified Golay codes to said one or more transducers at a second time period;

means for receiving after the first time period a first set of reflected signals of the first set of the ultrasound pulse reflected on the object and receiving after the second time period a second set of reflected signals of the ultrasound pulse reflected on the object;

means for performing pulse compression on the first and second sets of reflected signals to produce a first and a second pulse-compressed signals and adding the first and the second pulse compressed signals;

means for producing a receive-focused signal by using the added signal; and means for displaying an image according to the receive-focused signal after signal processing.

BRIEF DESCRIPTION OF THE DRAWINGS

The aforementioned aspects and other features of the invention will be explained in the following description, taken in conjunction with the accompanying drawings wherein.

DETAILED DESCRIPTION OF THE PREFERRED INVENTION

The present invention is characterized with the use of modified Golay codes in the ultrasound transmission. The modified Golay codes used in the present invention consists of a pair of complementary binary sequences of a same length. The autocorrelations of the complementary sequences has a same main lobe and side lobes of a same magnitude but of opposite polarities. Accordingly, the summation of the autocorrelations of the complementary sequences has a main lobe of which magnitude is double that of the main lobe of the autocorrelation of each sequence and has no side lobes.

Figure 2A:
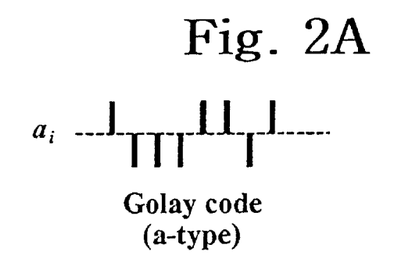
FIGS. 2A to 2E are graphs for illustrating characteristics of Golay codes.
Figure 2B:
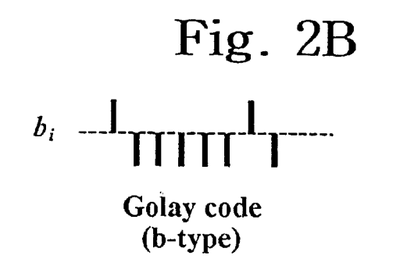
Figure 2C:
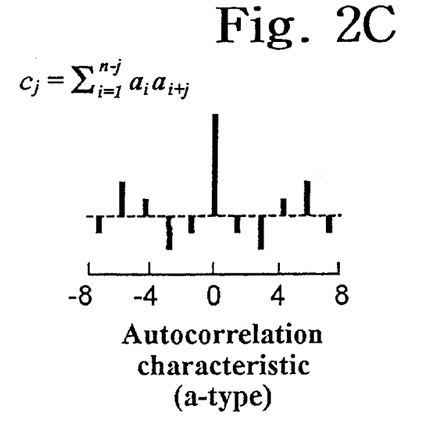
Figure 2D:
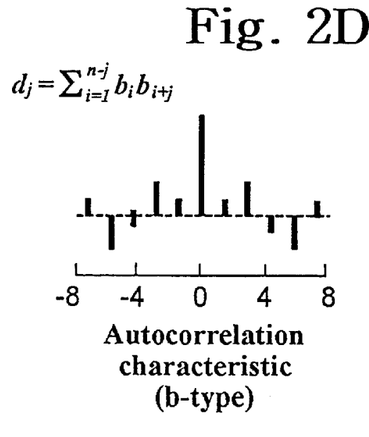

FIG. 2 represents the characteristics of Golay codes. FIGS. 2A and 2B show a pair of the complementary Golay codes and FIGS. 2C and 2D show the autocorrelations of the complementary Golay codes. And FIG. 2E is the summation of the autocorrelations shown in FIGS. 2C and 2D. In FIG. 2, $a_i$ and $b_i$ represent the binary elements of the complementary codes of a code length, having either +1 or −1. And the autocorrelations of the codes are represented as following $$c_j = \sum_{i=1}^{i=n-j} a_i a_{i+j}$$

$$d_j = \sum_{i=1}^{i=n-j} b_i b_{i+j}$$

Eq. (1)

Figure 2E:
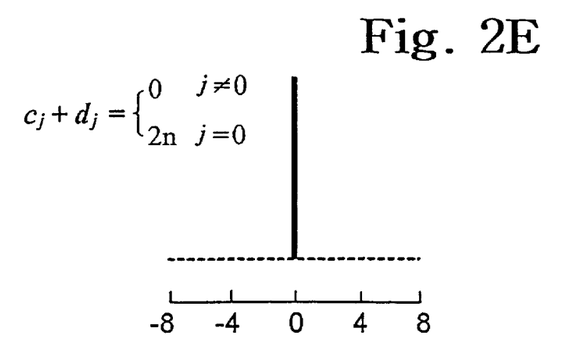

Then the summation of the autocorrelations can be represented as follows.

$$c_j + d_j = 0; j \neq 0$$

$$c_j + d_j = 2n$$

Eq. (2)

As described above, with the respect to the frequency characteristic, the frequency spectrums of the Golay codes are wider than that of the typical ultrasound transducer. That is, there is some loss in the power of the Golay codes at the transducer. Accordingly, there is a demand for a method of transmitting the energy of the Golay codes effectively.

Figure 3A:
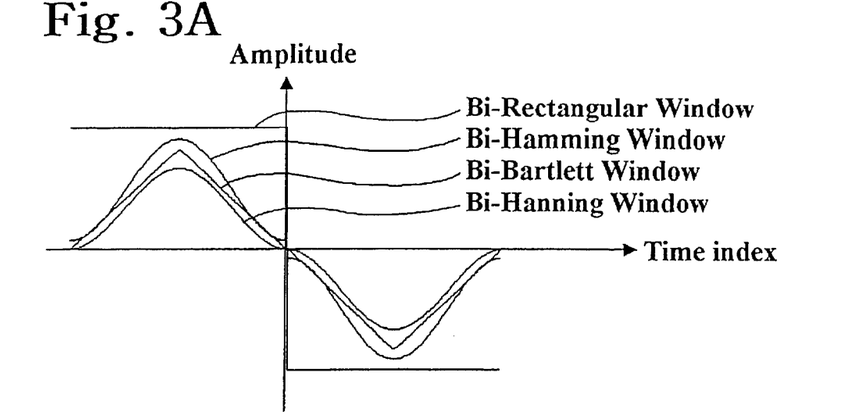
FIG. 3A shows windows used for modifying the Golay codes.

For such a purpose, the present invention modifies the Golay codes by multiplying by one of window functions that are used in the FIR (Finite Impulse Response) filter design. The summation of the autocorrelations of a received signal from an object after transmitting the modified Golay code signals has the main lobe determined by the autocorrelation of the window used and no side lobes which would have resulted from the characteristics of the unmodified Golay codes. In FIG. 3A, there are provided time index waveforms of some windows which can be used to produce the modified Golay codes, which are bi-phase rectangular window, bi-phase Hamming window, bi-phase Hanning window and bi-phase Bartlett window.

Now, modified Golay codes will be described with an example. It is assumed that the Golay codes with the code length 8 are [1,-1,-1,-1,1,1,-1,1] and [1,-1,-1,-1,-1,-1,1,-1], the center frequency (fo) of a transmitted signal is 5 MHz and the sampling frequency(fs) of the transmitted signal is 40 MHz, respectively, that is, the chip rate(fo/fs) is 8.

For example, when the conventional Golay codes are used, the codes as follows are applied to the pulser for ultrasound transmission.

Ga=[1 1 1 1 1 1 1 1 -1-1-1-1-1-1-1-1 -1-1-1-1-1-1-1-1 -1-1-1-1-1-1-1-1 1 1 1 1 1 1 1 1 1 1 1 1 1 1 1 1 1 1 1 1 -1-1-1-1-1-1-1-1 1 1 1 1 1 1 1 1]

Gb=[1 1 1 1 1 1 1 1 -1-1-1-1-1-1-1-1 -1-1-1-1-1-1-1-1 -1-1-1-1-1-1-1-1 -1-1-1-1-1-1-1-1 -1-1-1-1-1-1-1-1 -1-1-1-1-1-1-1-1 1 1 1 1 1 1 1 1 -1-1-1-1-1-1-1-1]

In order to improve TPE(Transmit Power Efficiency), defined as the ratio of the output power to the input of the transducer, the present invention uses modified Golay codes instead of the conventional Golay codes.

For example, by multiplying the conventional Golay codes by a bi-phase rectangular window, the modified Golay codes are obtained as follows.

Ga'=[1 1 1 1 -1-1-1-1 -1-1-1-1 1 1 1 1 -1-1-1-1 1 1 1 1 -1-1-1-1 1 1 1 1 1 1 1 1 1-1-1-1-1 1 1 1 1-1-1-1-1 1 1 1 1 1 1 1 1 1-1-1-1-1 1 1 1 1-1-1-1-1]

Gb'=[1 1 1 1 -1-1-1-1 -1-1-1-1 1 1 1 1 -1-1-1-1-1 -1-1-1 -1-1-1-1 1 1 1 1 -1-1-1-1 1 1 1 1 1 1 1 1 1 1 1 1 1-1-1-1-1 -1-1-1-1 1 1 1 1]

A pair of modified Goaly codes of the present invention multiplied by a bi-phase rectangular function m(t) with a period T can be expressed as follows.

$$g_{am}(t) = g_a(t) \cdot \sum_k m(t-kT) \qquad \text{Eq. (3)}$$

$$g_{bm}(t) = g_b(t) \cdot \sum_k m(t-kT)$$

In the above Eq.(3), the $g_a(t)$ and $g_b(t)$ represent the conventional Golay codes and T is an inverse of the center frequency of the transducer characteristic function.

The summation of the autocorrelations of the pair of the modified Golay codes is expressed by following Eq.(4).

$$g_{am}(t)^* g_{am}(-t) + g_{bm}(t)^* g_{bm}(-t) = \text{ramp}(t/2T)^* m(t)^* m(-t) \qquad \text{Eq. (4)}$$

The ramp function is a triangular function that can be expressed as follows.

$$\text{ramp}(t/2T) = \frac{t}{T} + 1, \; -T \leq t \leq 0 \qquad \text{Eq. (5)}$$

$$\frac{-t}{T} + 1, \; 0 < t < T$$

The summation of the autocorrelations can also be computed as follows.

$$g_{am}(t)^* g_a(-t) + g_{bm}(t)^* g_b(-t) = \text{ramp}(t/2T)^* m(t) \qquad \text{Eq. (6)}$$

When modified Golay codes are used, the TPE and the width of the main lobe are determined in accordance with a window used. And when the bi-phase rectangular window is used, a bi-polar pulser can be used to generate pulses. However, when other windows like the Hanning and Hamming window is used, a Digital-to-Analog Converter is needed to linearly amplify the bipolar pulses from the bipolar pulser.

Figure 3B:
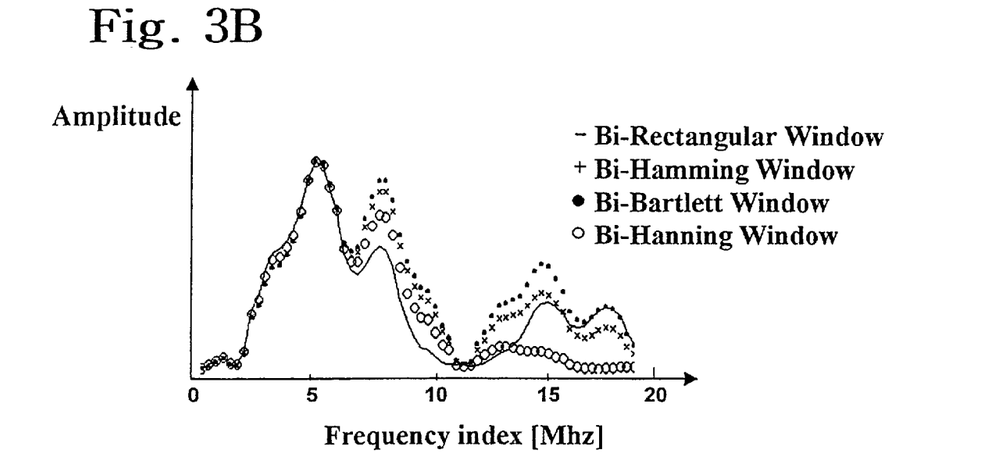
FIGS. 3B and 3C are graphs for illustrating characteristics of the modified Golay codes used in the present invention.

FIG. 3B are graphs for illustrating frequency domain characteristics of the modified Golay codes multilplied by a bi-phase rectangular window, bi-phase Hamming window, bi-phase Hanning window and bi-phase Bartlett window.

Figure 3C:
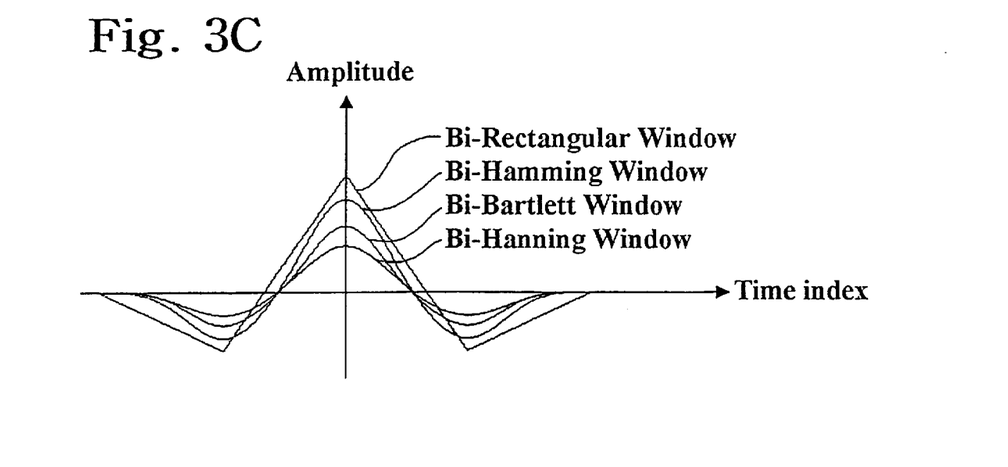

FIG. 3C represents the summation results of the autocorrelations when the signals shown in FIG. 3B are used for TX(transmission) and RX(receiving).

Figure 4:
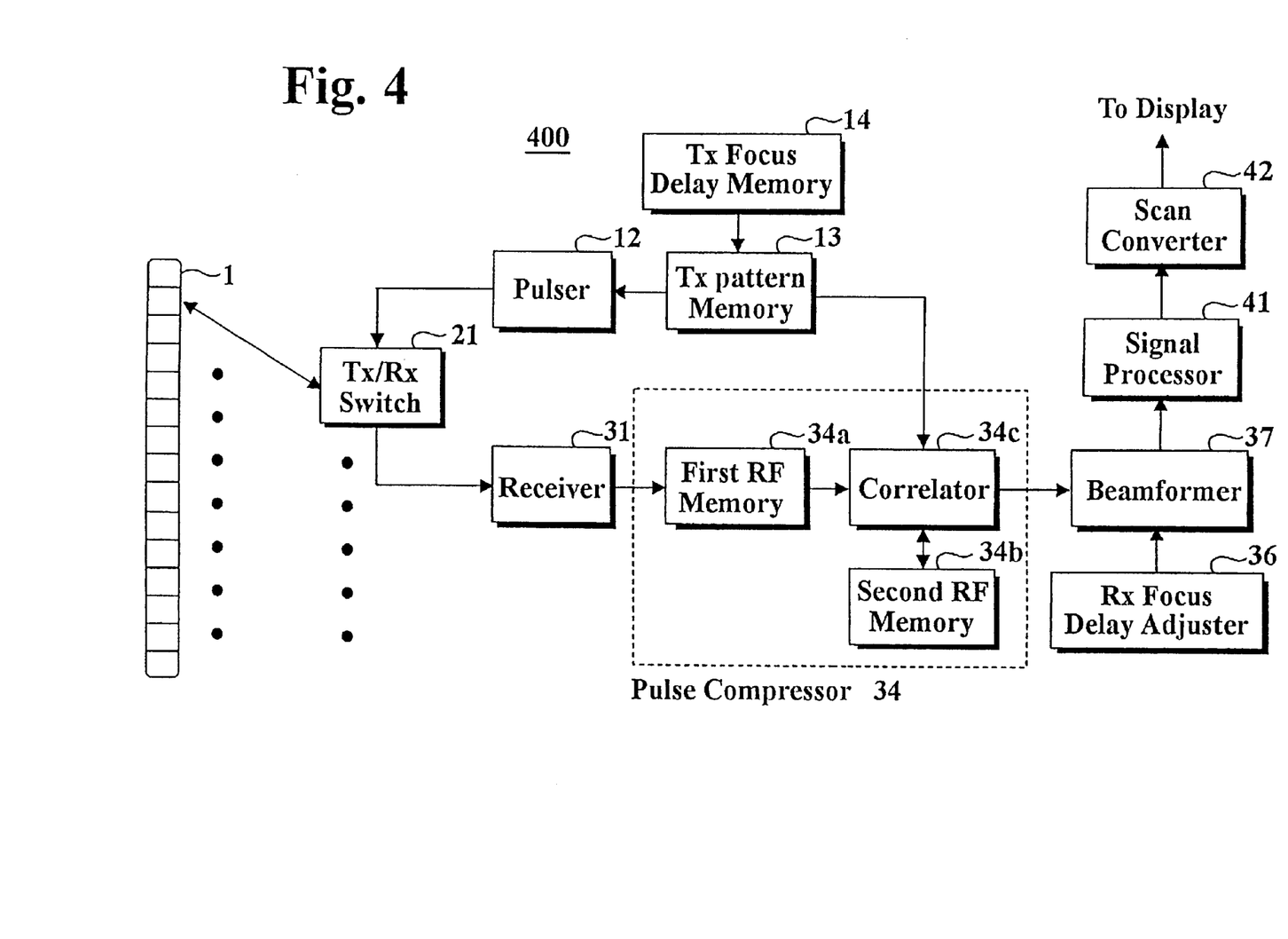
FIG. 4 represents a block diagram of an ultrasound imaging system based on pulse compression technique using the modified Golay codes in accordance with the present invention.

FIG. 4 is a block diagram of an ultrasound imaging system 400 in accordance with a preferred embodiment of the present invention. As described above, the ultrasound imaging system 400 is characterized in that the pulse compression using RF data is performed before RX beamforming and then the pulse-compressed signal is RX-focused. The present invention eliminates side lobes in the ultrasound propagation direction in near field, which will be generated when the pulse compression is performed after RX-focusing. And also, the present invention prevents the width of the main lobe from increasing.

In FIG. 4, the imaging system 400 which comprises a pulser 12, a TX pattern memory 13, a TX focus delay memory 14, a TX/RX switch 21, a receiver 31, a pulse compressor 34, a RX focus delay adjuster 36, a beamformer 37, a signal processor 41 and a scan converter 42. The pulse compressor 34 includes a first RF memory 34a, a second RF memory 34b and a correlator 34c. The present system improves SNR by using modified Golay codes and the correlator 34c.

The TX focus delay memory 14 stores a delay pattern for ultrasound TX and the TX pattern memory 13 stores a TX code pattern. According to the present invention, the TX code pattern is a pair of modified Golay codes. The TX code pattern stored at the memory 13 is applied to the pulser 12, which is delayed according to the delay pattern. Instead that the TX pattern memory 13 and the TX focus delay memory 14 stores the preliminarily computed TX code pattern and delay pattern to provide as the pulser input as shown in FIG. 4, a circuit or software may be provided to produce delayed TX code pattern.

According to a window used, the pulser 12 amplifies the TX code pattern applied from the TX pattern memory 13. When a rectangular window is used, a bi-polar pulser can be used as the pulser 12 to apply a bi-polar pulse to the transducer array 1 via the TX/RX switch 21. When other window than the rectangular window is used, the pulser 12 includes the bi-polar pulser and a linear amplifier to apply a linearly amplified bi-polar pulse to the transducer array 1. As described above referring to FIG. 1, for the ultrasound TX of the Golay code pattern, either a fixed focus technique or a synthetic aperture technique may by used.

According to the present invention, the transducer array 1 transmits the ultrasound pulses corresponding to a first code ($g_{am}$) of a pair of modified Golay codes and receives the reflected signal corresponding to the first code, which reflected from an object such as a human body. And subsequently, the transducer 1 transmits the ultrasound pulses corresponding to a second code ($g_{bm}$) of the pair of the modified Golay codes and receives the reflected signal corresponding to the second code, which reflected from the object.

As similarly in FIG. 1, the TX/RX switch 21 acts as a duplexer to isolate the receiver 31 from the effect of the high voltage from the pulser 12.

The signal received by the receiver 31 is not proper to form an image because it has high side-lobes. Accordingly, the pulse compressor 34 is used to process the received signal so that resolution of the resultant image is comparable to that of the conventional imaging system using the short pulses.

At first, in the pulse compressor 34, the RF signal received by the receiver 31 is stored at the first RF memory 34a. Since the RF signal for each channel is stored at the memory 34a, the correlator 34c can be provided by hardware implementation or software implementation selectively. And also, when the conventional short pulse is used rather than the Golay code, the system shown in FIG. 4 is provided as the conventional ultrasound imaging system by bypassing the correlator 34c.

The correlator 34c computes the autocorrelation of the signal applied from the receiver 31 and stored at the memory 34a.

The second memory 34b stores temporarily the autocorrelation of the Golay code. When the Golay code is used, temporal storage is needed because the TX/RX is performed twice. In FIG. 4, though the first and second memories 34a and 34b are illustrated respectively, they can be integrally implemented as a mono-block. And also, depending on a design, the first memory 34a can be omitted. When the first memory 34a is used, various signal processing techniques in addition to the present invention can be applied to improve the resultant image quality because the RF data is stored at the first memory 34a.

After the correlator 34c computes the autocorrelation for the second Golay code, the pulse-compressed signal is obtained by summation of the autocorrelation for the second code and the temporarily stored autocorrelation at the memory 34b. And then, the pulse-compressed signal is applied to the beamformer 37.

The beamformer 37 performs the RX-focusing referring to the RX focus delay at the RX focus delay adjuster 36. After the RX-focusing, envelope detection and log compensation is performed by the signal processor 41 to produce a B-mode image signal. The scan converter 42 converts the B-mode image signal from the signal processor 41 to the desired image for a display (not shown).

While there has been described and illustrated preferred characteristics of the present invention, it will be apparent to those skilled in the art that variations and modifications thereof are possible.

For example, some other modified Golay codes rather than the described above can be used in ultrasound TX. And also, the delay and/or code pattern can be computed by various schemes other than storing them at memories. And, in addition to what shown in FIG. 4, some known ultrasound image improving techniques can be used in the ultrasound imaging system 400.

Accordingly, it should be understood that variations and modifications are possible without deviating from the broad principles and teachings of the present invention which shall be limited solely by the scope of the claims appended hereto.

Figure 5A:
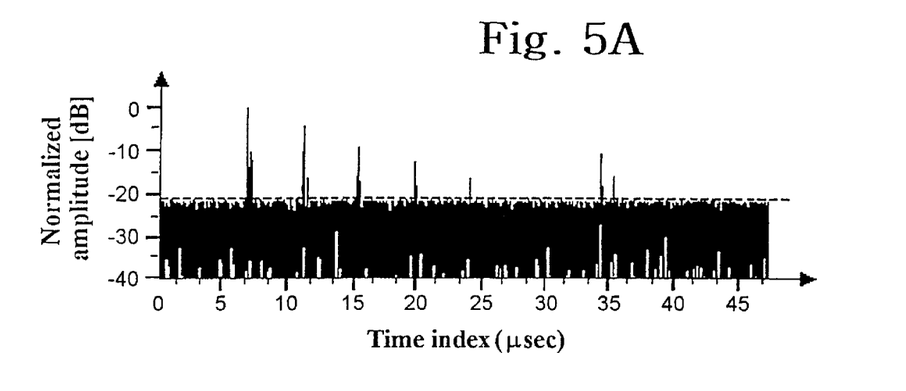
FIGS. 5A to 5C offer graphs of correlated signals as obtained by using the conventional pulse, the Golay codes and the modified Golay codes.
Figure 5B:
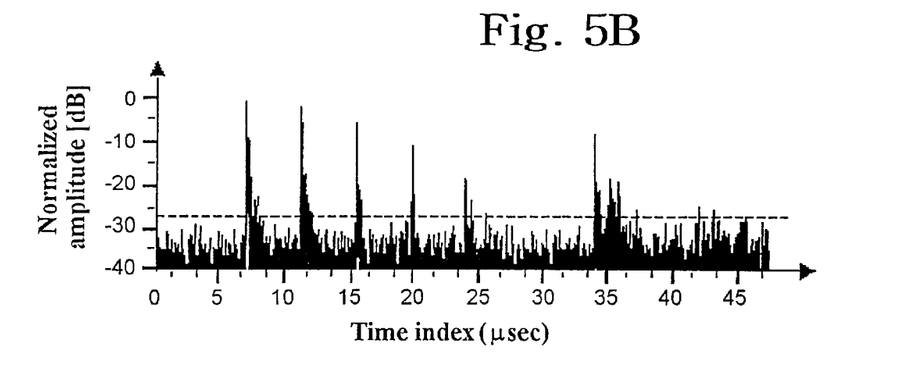
Figure 5C:
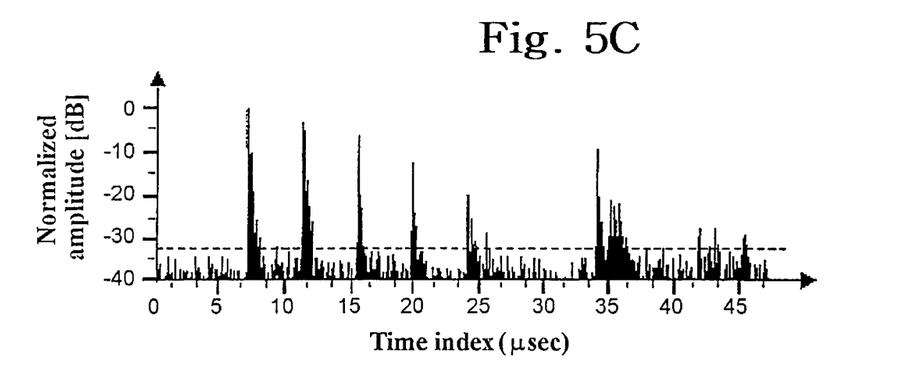

FIGS. 5A to 5C offer graphs of correlated signals as obtained with the conventional pulse, the Golay code and the modified Golay code respectively. As shown in FIGS. 5A and 5B, the noise level of the Golay code case is much lower than the conventional short pulse case. And, as shown in FIGS. 5B and 5C, the SNR of the modified Golay code case is 4 dB greater than that of the Goaly code case.

That is, since the modified Golay code used in the present invention have compatibility with the frequency spectrum of the conventional ultrasound transducer, the power loss at the ultrasound transducer is low. Accordingly, the SNR of the present system 400 is higher than the conventional Golay code imaging system.

And, because the pulse compression is performed over the RF signal before beamforming, the present invention can eliminate the signal distortion, especially in near field, which is produced when the pulse compression is performed after beamforming.

And, the present imaging system 400 is designed to accommodate not only the case of using the modified Golay code but also the case of various codes and the short pulse.

What is claimed is:

1. An ultrasound imaging method for forming an image of an object using signals reflected from the object after transmitting an ultrasound pulse to the object, comprising the steps of:
   (a) transmitting a first set of the ultrasound pulses to the object by applying voltages according to a first code of a pair of modified Golay codes to one or more transducers;
   (b) performing pulse compression on a first set of reflected signals of the first set of the ultrasound pulses reflected from the object;
   (c) transmitting a second set of the ultrasound pulses to the object by applying the voltages according to a second code of the pair of the modified Golay codes to said one or more transducers;
   (d) performing pulse compression on a second set of reflected signals of the second set of the ultrasound pulses reflected from the object;
   (e) adding the pulse compressed signals of the first and the second sets of the reflected signals;
   (f) producing a receive-focused signal by using the added signal to form the image of the object; and
   (g) displaying the image.

2. The method of claim 1, wherein the modified Golay codes are produced by applying a bi-phase window over the Golay codes.

3. The method of claim 2, wherein the bi-phase window is one of a bi-phase rectangular window, a bi-phase Hamming window, a bi-phase Hanning window and bi-phase Bartlett window.

4. The method of claim 1, wherein the step (b) includes step of computing convolution of the first set of the reflected signals and the first modified Golay code and the step (d) includes step of computing convolution of the set of the second reflected signals and the second modified Golay code.

5. The method of claim 1, wherein the step (b) includes step of computing the autocorrelation of the first set of the reflected signals and the step (d) includes step of computing the autocorrelation of the second set of the reflected signals.

6. An ultrasound imaging apparatus for forming an image of an object using signals reflected from the object and received after transmitting an ultrasound pulse to the object, comprising:
   means for applying voltages according to a first code of a pair of modified Golay codes to one or more transducers at a first time period and for applying the voltages according to a second code of the pair of the modified Golay codes to said one or more transducers at a second time period;
   means for receiving after the first time period a first set of reflected signals of the first set of the ultrasound pulse reflected on the object and receiving after the second time period a second set of reflected signals of the ultrasound pulse reflected on the object;
   means for performing pulse compression on the first and second sets of reflected signals to produce a first and a second pulse-compressed signals and adding the first and the second pulse compressed signals;

means for producing a receive-focused signal by using the added signal; and means for displaying an image according to the receive-focused signal after signal processing.

7. The apparatus of claim 6, wherein the modified Golay codes is produced by applying a bi-phase window over the Golay codes.

8. The apparatus of claim 6, wherein the bi-phase window is one of a bi-phase rectangular window, a bi-phase Hamming window, a bi-phase Hanning window and bi-phase Bartlett window.

9. The apparatus of claim 6, wherein the pulse compression performing means includes a correlator for obtaining autocorrelations of each of the reflected signals.

10. The apparatus of clamin 9, wherein the pulse compression performing means further includes a memory for storing temporarily the autocorrelation of the first set of the reflected signals.

11. The apparatus of claim 6, wherein the pulse compression performing means further includes a memory for storing the first and second sets of the reflected signal.

12. The apparatus of claim 6, wherein the pulse compression performing means includes:

means for computing convolution of the first set of the reflected signals and the first modified Golay code; and means for computing convolution of the second set of the reflected signals and the second modified Golay code.

* * * * *